Oct. 3, 1950     E. SUTHERLAND     2,524,299
METER READING RECORDER
Filed Oct. 18, 1945     2 Sheets-Sheet 1
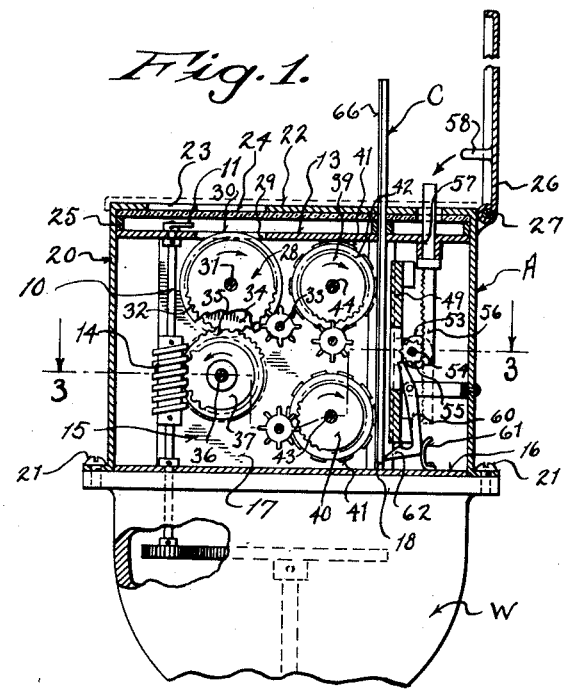
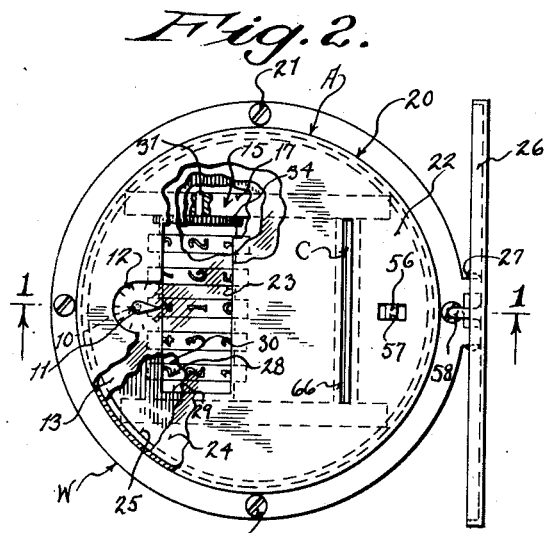
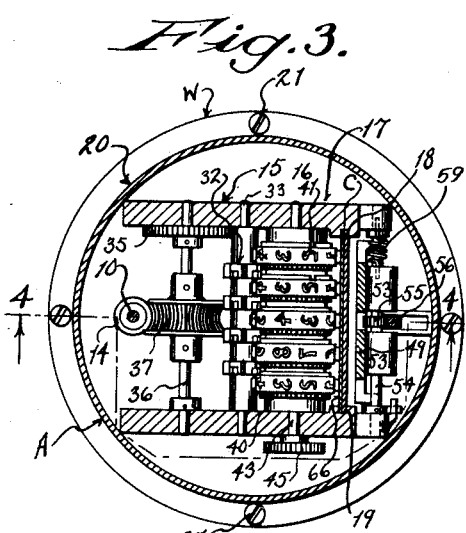
INVENTOR
EVERETT SUTHERLAND
BY
ATTORNEYS Oct. 3, 1950 E. SUTHERLAND 2,524,299
METER READING RECORDER
Filed Oct. 18, 1945 2 Sheets-Sheet 2
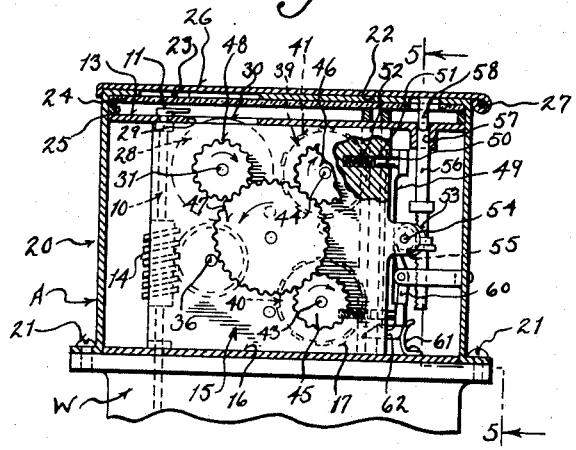
INVENTOR
EVERETT SUTHERLAND
BY
ATTORNEYS Patented Oct. 3, 1950

2,524,299

UNITED STATES PATENT OFFICE 2,524,299

METER READING RECORDER

Everett Sutherland, Chicago, Ill.

Application October 18, 1945, Serial No. 622,972

3 Claims. (Cl. 346—78)

1

This invention appertains to commodity meters utilized for measuring and recording the amount of water, gas or electricity, as the case may be, used during a certain period of time by the occupant of a building, apartment, or the like.

One of the primary objects of my invention is to provide novel means incorporated with such meters for facilitating the reading of the meters by an ordinary layman, whereby the occupant of a building can find out for himself the amount of the commodity used, and the cost thereof.

Another important object of my invention is to provide means incorporated with a meter whereby upon insertion of a card therein, the amount of the commodity used, and the cost thereof, will be automatically stamped upon said card so that a legible printed record will be had.

A further important object of my invention is to provide means operable upon swinging movement of the cover for setting the printing mechanism in condition for use, so that upon the insertion of the card in the meter, said printing mechanism will be automatically tripped and set into operation for marking the card.

A still further important object of my invention is to provide an improved means for facilitating the reading of the meters, both for the householder and the public utility companies, so that work in keeping accounts will be greatly simplified.

With these and other objects in view, the invention consists in the novel construction, arrangement and formation of parts, as will be hereinafter more specifically described, claimed and illustrated in the accompanying drawings, in which drawings:

Figure 1 is a sectional view through a meter constructed in accordance with my invention, the section being taken substantially on the line 1—1 of Figure 2.

Figure 2 is a top plan view of my improved meter showing the cover thereof in a raised position and with parts of the meter broken away and in section to illustrate structural detail.

Figure 3 is a horizontal sectional view taken substantially on the line 3—3 of Figure 1, looking in the direction of the arrows.

Figure 4 is a sectional view similar to Figure 1 but taken on the line 4—4 of Figure 3, looking in the direction of the arrows and showing the frame for the mechanism in elevation and the cover of the meter in its closed position for holding an operating rack bar in a lowered position.

Figure 5 is a detail sectional view taken at right angles to Figures 1 and 4, the section being taken on the line 5—5 of Figure 4, looking in the direction of the arrows, and Figure 6 is a perspective view of one type of card which can be used with the meter showing the cost and amount of the commodity used.

Referring to the drawings in detail, wherein similar reference characters designate corresponding parts throughout the several views, the letter W indicates the body portion of a water meter of the type now commonly used, and A my novel attachment therefor. Extending from the body portion W of the meter, is a drive shaft 10 which is ordinarily employed for operating the pointers of the meter dials and this shaft is provided with an indicating pointer 11 which travels over a dial face 12, which is carried by a top frame plate 13. It is noted that the shaft 10 has keyed, or otherwise secured thereto, a worm 14 which drives my mechanism, as will be later described.

The top frame plate 13 forms a part of a frame 15 and this frame 15 also includes a bottom plate 16. Connecting the top and bottom walls or plates 13 and 16 are a pair of spaced parallel side frame plates 17. These side frame plates support the various operating parts of my device and it is to be noted at this time that the inner faces of the side frame plates 17 have formed thereon vertical guide ribs 18 having tracks or guideways 19 formed therein for the reception of the recording card C which will be later described.

The entire frame 15 and the mechanism carried thereby is housed within a casing 20 and this casing 20 is secured, as at 21, to the top of the meter body W. The casing 20 can be substantially of a cylindrical form, if so desired and includes a top wall 22 having a sight opening 23 therein so that certain parts, such as the meter hand 11 can be seen. A glass or other transparent plate 24 is held tight against the inner surface of the top wall 22 by means of gaskets, or the like, 25, which are disposed between the top wall 22 and the top frame plate 13. A swinging cover 26 is also provided for the top of the casing so as to protect the same from dust, dirt, and the like, and this cover 26 is connected to one side of the casing by means of a hinge 27. The top wall 22 of the casing, the glass pane 24 and the top plate 13 of the frame are all provided with registering slots so as to permit the free insertion of the card C into the guide tracks or grooves 19 of the frame.

In accordance with my invention, I provide means 28 for permitting the meter to be read in the ordinary way and this means is disposed adjacent to the meter hand 11 and under the sight opening 29 formed in the top frame plate 13. This sight opening 29 is directly under the sight opening 23 formed at the top wall of the casing.

The means 28 for permitting the meter to be read in the ordinary way consists of a register or counter which includes a plurality of numbered wheels or cylinders 30. The register is of the type commonly used and the numbered wheels or cylinders 30 are the same as the wheels or cylinders used in automobile odometers. All of the wheels or cylinders 30 except the first on the right hand upper side (see Figure 2) are rotatably mounted upon a supporting shaft 31 journaled in the side frame plates 17. The register 28 is of the type, that when the first cylinder or wheel has made one revolution, the next adjacent wheel will be moved one space or one numeral and when this wheel or cylinder has made one complete revolution, it will turn the next adjacent cylinder or wheel one space or one numeral. This is accomplished through interengaging, appropriately arranged teeth. or the like, 32, on the cylinders and a cooperating shaft 33, which is also journaled in the side frame plate 17. The register is driven from the meter shaft 10 and the first cylinder or wheel has operatively connected thereto a spur gear 34 which meshes with a similar gear 35 keyed, or otherwise secured to a countershaft 36 which is journaled in the side frame plate 17. This shaft has keyed, or otherwise secured thereto, a worm wheel 37 which meshes with the worm 14 on the meter shaft 10. Obviously, these parts are driven in proper time relation and the meter can be read by raising the cover 26 and observing the upper-most numerals on the cylinders of the register.

I provide two similar printing registers 39 and 40 for stamping the card C with the amount of the commodity used and the cost thereof. The upper register 39 is utilized for giving the amount of the commodity consumed and the lower register 40 is utilized for giving the cost thereof, and these registers are driven from the first register 28, as will be later described. As stated, the registers 39 and 40 are the same as or similar to the register 28, the only difference being that the wheels or cylinders of the registers 39 and 40 must be provided with raised printing numerals 41. Each of the registers 39 and 40 include the cylinders 41 carrying the raised numerals, and these cylinders are mounted respectively on the drive shafts 43 and 44. The ends of these shafts 43 and 44 have secured respectively thereto spur gears 45 and 46 of equal sizes, and these spur gears mesh with an idle gear 47, which is driven from a spur gear 48 keyed, or otherwise secured to the shaft 31 of the first register 28. The gears are all so proportioned that all parts will be driven at the correct and desired speed relative to the meter shaft.

To bring about the printing of the card C, I utilize a strike plate 49 which is mounted adjacent to the guides or ribs 18 for movement transversely thereof and toward and away from a card C positioned in said ribs or guideways. The corners of the strike plate carry inwardly extending guide pins 50 which are received within guide openings 51 formed in the side frame plates, and expansion springs 52 are fitted in the openings and bear against the pins. This normally urges the strike plate away from the card. The springs also urge the strike plate into engagement with a cam 53 carried by a cam shaft 54 which is mounted for turning movement in bearings carried by the side frame plate 17. Also mounted rigidly on the shaft 54 is a pinion 55, which meshes at all times with the teeth of a rack bar 56. This rack bar slidably extends through the suitable guide openings 57 formed in the top frame plate 13, the glass pane 24 and the top wall 22 of the casing. An operating arm 58 is carried by the swinging cover 56 for operating said rack bar at certain times, as will also be later described.

Wound upon the cam shaft 54 is a coil spring 59 and this coil spring has one end secured to the cam shaft and the other end secured to the frame 15.

The rack bar 56 is normally held in a raised position, as shown in Figure 1, due to the tension of the spring 59 but when the cover 26 is lowered, the arm 58 will push down on the rack bar 56 and rotate the cam shaft through the medium of the pinion 55 and the coil spring 59 will be placed under increased tension. At this time, the high point of the cam 53 will be turned away from the strike plate 49 and said strike plate will be held against the low point of the cam.

To prevent normal rotation of the cam shaft 54 under influence of the spring 59, when said spring is under tension, I utilize a pivoted dog 60 and the toothed upper end of the dog is normally held in engagement with the teeth of the pinion by a tension spring 61. The lower end of the dog has formed thereon a beveled trip foot 62, the purpose of which will also be described.

Now referring to the card C, the same can be suitably printed to show the consumer's name and address, as at 63, and also printed on the card can be the legend "cu. ft. consumed" and the word "cost" as at 64 and 65. The card is relatively stiff and the front face thereof can have removably attached thereto a piece of carbon paper 66.

Considering that the cover 26 is closed and the spring 59 is loaded or placed under tension, and it is desired to read the meter, the cover 26 is raised. The rack bar 56 will be held in its lowered position and the cam shaft against movement by the dog 60. The consumer, or other person reading the meter, now inserts the card C with the carbon paper in the meter and into the grooves in the guide ribs 18. The carbon paper faces the printing cylinders of the register with the inked face thereof next to the card C. When the card is inserted the entire distance in the meter, the lower edge thereof will strike the foot 62 and move the upper toothed end of the dog 60 away from the pinion. This will allow the shaft 54 to rapidly rotate under the influence of the spring 59 and the high point of the cam 53 will forcibly urge the strike plate into engagement with the card C and the card C will be forcibly moved with the carbon paper against the facing numerals of the register and the card will be imprinted. The shaft 54 will make one complete revolution and the cam 53 will ride past the strike plate 49. The parts now assume the position shown in Figure 1 and the tension of the spring will be spent. The card can now be withdrawn. The cover 26 can now be closed and the arm 58 will push down on the rack bar and lower the same the correct and desired distance. As the rack bar lowers, the shaft 54 is rotated one complete revolution in the reverse direction and the parts assume the position shown in Figure 4. It will be noted that the high point of the cam is away from the strike plate. The device is now set for the next operation of printing a card.

The consumer or the meter man now has a complete printed record of the number of feet of the commodity consumed and the cost thereof. Obviously, when the meter is read at the next given period, the cost and the cu. ft. shown on the card at the last time the meter was read is deducted from the new card.

While I have used the term cu. ft. in certain places in the specification and claims, as the unit of measurement for the commodity being used, it is to be understood that the unit of measurement can be gallons, kilowatts, or the like, depending, of course, on the commodity being used.

Changes in details may be made without departing from the spirit or the scope of my invention, but what I claim as new is:

1. The combination with a meter including registering wheels having raised printing numbers thereon, a card movable into and out of the meter and adjacent to said registering wheels, and means automatically operable upon the insertion of the card in the meter for printing the numbers to be read on said registering wheels on said card, including a strike plate movable toward and away from the card, a cam shaft, spring means normally urging the high point of the cam toward the strike plate for urging the strike plate and the card toward the registering wheels, means for rotating the cam shaft for moving the high point of the cam away from the strike plate and to place the spring of said shaft under tension, means for normally holding the shaft against rotation under tension of its spring, said means being operable to release the shaft upon the insertion of the card in the meter.

2. The combination with a meter including registering wheels having raised printing numbers thereon, a card movable into and out of the meter and adjacent to said registering wheels, and means automatically operable upon the insertion of the card in the meter for printing the numbers to be read on said registering wheels on said card, including a strike plate movable toward and away from the card, a cam shaft, spring means normally urging the high point of the cam toward the strike plate for urging the strike plate and the card toward the registering wheels, means for rotating the cam shaft for moving the high point of the cam away from the strike plate and to place the spring of said shaft under tension, means for normally holding the shaft against rotation under tension of its spring, said means being operable to release the shaft upon the insertion of the card in the meter, said means for rotating the shaft including a pinion on the shaft and a sliding rack bar engaging the pinion, said rack bar being movable exteriorly of the meter when the shaft is rotated under tension of its spring.

3. The combination with a meter including registering wheels having raised printing numbers thereon, a card movable into and out of the meter and adjacent to said registering wheels, and means automatically operable upon the insertion of the card in the meter for printing the numbers to be read on said registering wheels on said card, including a strike plate movable toward and away from the card, a cam shaft, spring means normally urging the high point of the cam toward the strike plate for urging the strike plate and the card toward the registering wheels, means for rotating the cam shaft for moving the high point of the cam away from the strike plate and to place the spring of said shaft under tension, means for normally holding the shaft against rotation under tension, means for normally holding the shaft against rotation under tension of its spring, said means being operable to release the shaft upon the insertion of the card in the meter, said means for rotating the shaft including a pinion on the shaft and a sliding rack bar engaging the pinion, said rack bar being movable exteriorly of the meter when the shaft is rotated under tension of its spring, and means for depressing the rack bar including a hinged cover for the meter and an arm carried by said cover.

EVERETT SUTHERLAND.

REFERENCES CITED

The following references are of record in the file of this patent:

UNITED STATES PATENTS

| Number | Name | Date |
| --- | --- | --- |
| 853,637 | Hawkins | May 14, 1907 |
| 1,224,834 | Blackmer | May 1, 1917 |
| 1,239,680 | Einstein | Sept. 11, 1917 |
| 2,086,363 | McMullen | July 6, 1937 |
| 2,122,319 | Josephson | June 28, 1938 |
| 2,138,287 | Willers | Nov. 29, 1938 |
| 2,143,516 | Hazard | Jan. 10, 1939 |
| 2,259,065 | Erisman et al. | Oct. 14, 1941 |